W. HAMMOND.
Wheel-Cultivator and Gang-Plow.

No. 55,093. Patented May 29, 1866.

Witnesses:
Preston Mitchell
George Johnson

Inventor:
Wm Hammond

UNITED STATES PATENT OFFICE.

WILLIAM HAMMOND, OF MARSHALL, MICHIGAN.

IMPROVEMENT IN WHEEL-CULTIVATORS AND GANG-PLOWS.

Specification forming part of Letters Patent No. 55,093, dated May 29, 1866.

*To all whom it may concern:*

Be it known that I, WILLIAM HAMMOND, of the city of Marshall, in the county of Calhoun and State of Michigan, have invented a new and useful Improvement in Wheel-Cultivators and Gang-Plows; and I do hereby declare that the following is a full, clear, and exact description of the construction and operation of the same, reference being had to the annexed drawings, making a part of this specification, in which—

Figure 1:
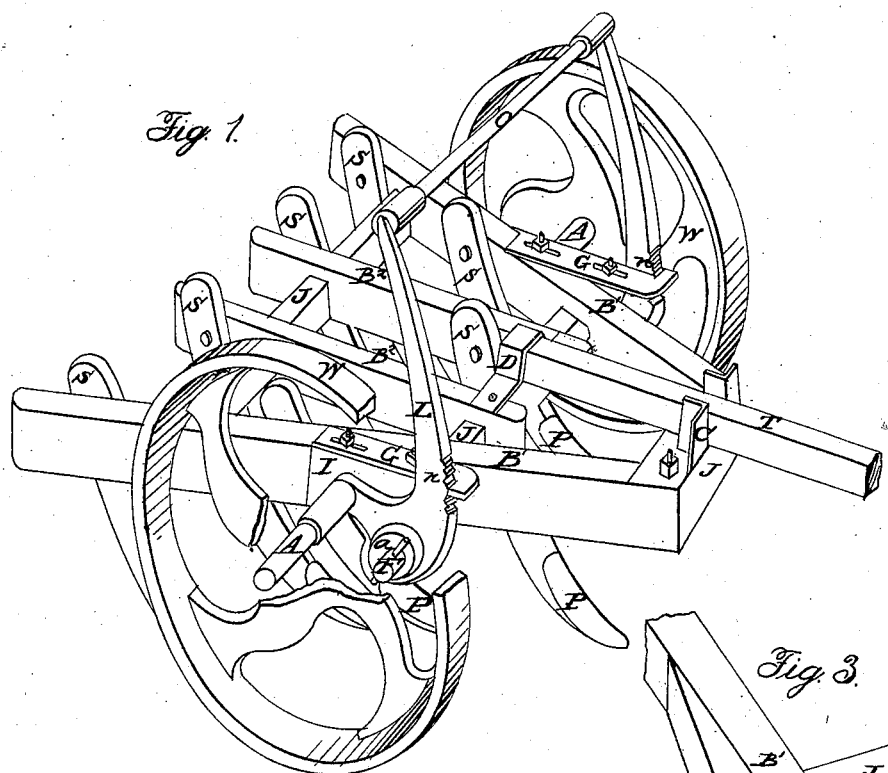
Figure 3:
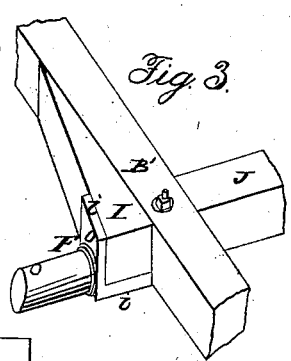
Figure 2:
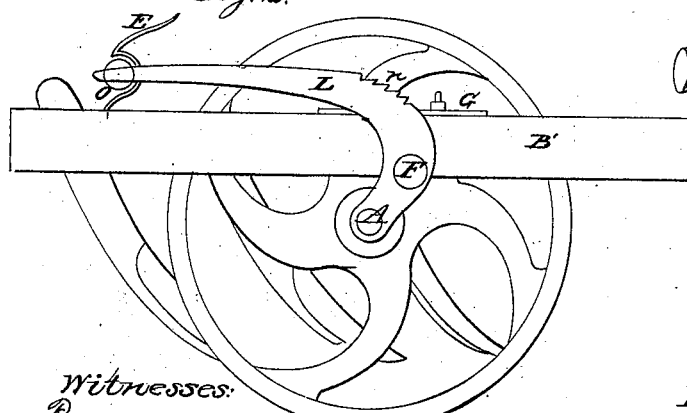

Figure 1 is a perspective view of a cultivator. Fig. 2 is a partial side elevation of same. Fig. 3 is a perspective view of the fulcrum-pin and surrounding portions of frame detached.

Similar letters of reference indicate corresponding parts in all the figures.

My invention relates to an arrangement of parts by the use of which the beams which constitute the frame and their attached teeth or plows can be lifted from the ground, when necessary, by a much less expenditure of labor and strength than is required by the ordinary mode of operating a cranked axle; and the better to enable those skilled in the art to construct my invention I will now proceed to describe it.

My invention is applicable to any of the known forms of arrangement of gang-plow or cultivator beams, subject, however, to such modifications as are hereinafter described; and it consists in attaching to each side of the frame or each outer beam a fulcrum-pin, (indicated at F,) upon each of which pins is a lever, with a short arm, bent substantially as shown in the drawings, where it is indicated at L, and having a bearing, *a*, at the angle of the bend, that is fitted so that it will turn freely. The sustaining-wheels of the implement are seen at W, which are fitted loosely on short axles forming a part of the lever aforesaid, which axles are represented at A at the extremity of the short bent arm. The levers are secured on the fulcrum-pins and the wheels on the axles by either nuts or linchpins and washers.

The drawings illustrate the mode in which I usually apply my improvement to cultivators, the beams of which—at least the outer—are arranged in a V form, where B' are in the shape of the sides of a triangle, of which the pole-stand C is the vertex. B² are two central parallel beams, the whole being firmly connected together so as to constitute a frame by the cross-girts J. The tongue or pole to which the draft-animals are attached is seen at T, secured in a loop, D, and stand aforesaid.

P indicates the teeth or plows, fastened in any of the usual ways to the stocks S, which stocks are arranged on and secured to the beams, &c., by bolts and stays in the ordinary manner.

I build up the sides of the frame parallel, immediately opposite to, and for a distance equaling the length of, the short cranked arms of the levers by attaching a triangular block, I, and secure the fulcrum-pin to this block and to the frame by means of bolts which pass through the angle-irons *i i*, which I cast or forge on the fulcrum-pin, as may be clearly seen in Fig. 3.

A good long bearing should be provided for the fulcrum-pin by bossing the lever, and the short axles, upon which the wheels are hung, should project sufficiently far to enable the wheels to run clear of the angular sides of the frame.

In order to maintain the plows when at work at any requisite depth in the ground and to properly adjust the same, I form a scale of notches, *n*, on the front edges of the levers, which notches engage with the side lips of the adjustable stop-gage plates G, which I fasten to the frame and lining-up blocks by bolts, which pass through them and through slots the plates in such manner as to prevent the weight of the frame and plows from revolving the lever and dropping them below the desired point.

If desired, the stop-plates may not be rigidly fastened when set, but allowed to slide, so that the operator may vary the depth of plowing at his pleasure without stopping the team, as applied in the ordinary way, by means of a lever and quadrant used to operate the common cranked axle, or by other equivalent devices.

When used for cultivators I connect the two bent levers together by a wooden cross-bar, O, the ends of which are inserted in sockets *s* cast in the upper ends of the said levers; but in the case of gang-plows the levers should not be so united, but be manipulated independently, for, as one wheel must travel in the furrow it is necessary to throw the line of the wheel-tread out of parallel with the line of the plows, which line should conform with the line of natural surface of ground, and for such use a rounded handle should supersede the socket at the end of the lever, as seen by dotted lines.

The usual mode of lifting the plows from the ground is by a lever applied to an axle hung transversely to the frame, the ends of such axle being bent forward to receive the wheels. The operator must thus push forward the lever in the direction the team is pulling, which is very laborious and difficult without stopping to accomplish at all.

In my arrangement the operator merely takes hold of the cross-bar or the handles of the levers, as the case may be, and resists their onward movement, when the action of the team in drawing will partially revolve the levers, and as my wheels are hung back of the fulcrum the frame and plows will be lifted so as to clear the ground in turning or to pass over any obstacle in the field, and when letting the plows back he merely eases them down by relaxing the effort to hold back. In going to or returning from the field the long arms of the levers are moved back to lie snugly against the upper side of the frame, where they may be secured by a catch, E, or any other convenient device, as seen in Fig. 2.

I do not claim, broadly, raising and lowering the frame and plows of a cultivator or gang-plow by rotating an axle on the bent or cranked ends of which the sustaining-wheels are hung, for this is old; but.

Having described my invention, what I claim, and desire to secure by Letters Patent, is—

The employment (independently or in connection with each other) of the bent axle-bearing levers L, in combination with the fulcrum-pins F and adjustable stop-gage plates G, connected and arranged relatively to and with the frame and wheels of a cultivator or gang-plow substantially as and for the purpose herein specified.

WM. HAMMOND.

Witnesses:
PRESTON MITCHELL,
GEORGE JOHNSON.